3,432,880
ADJUSTABLE TWO PART HINGE FITTING, ESPECIALLY FOR SEATS OF A MOTOR VEHICLE
Peter Ulrich Putsch, Moltkestrasse 14, Remscheid-Hasten, Germany, and Paul Werner, Herder Strasse 16, and Gustav Adolf Reinmoller, Max-Strasse 29, both of Remscheid, Germany
Filed June 12, 1967, Ser. No. 645,280
Claims priority, application Germany, June 12, 1966, P 39,679
U.S. Cl. 16—146  10 Claims
Int. Cl. E05d 11/10; B60m 1/02

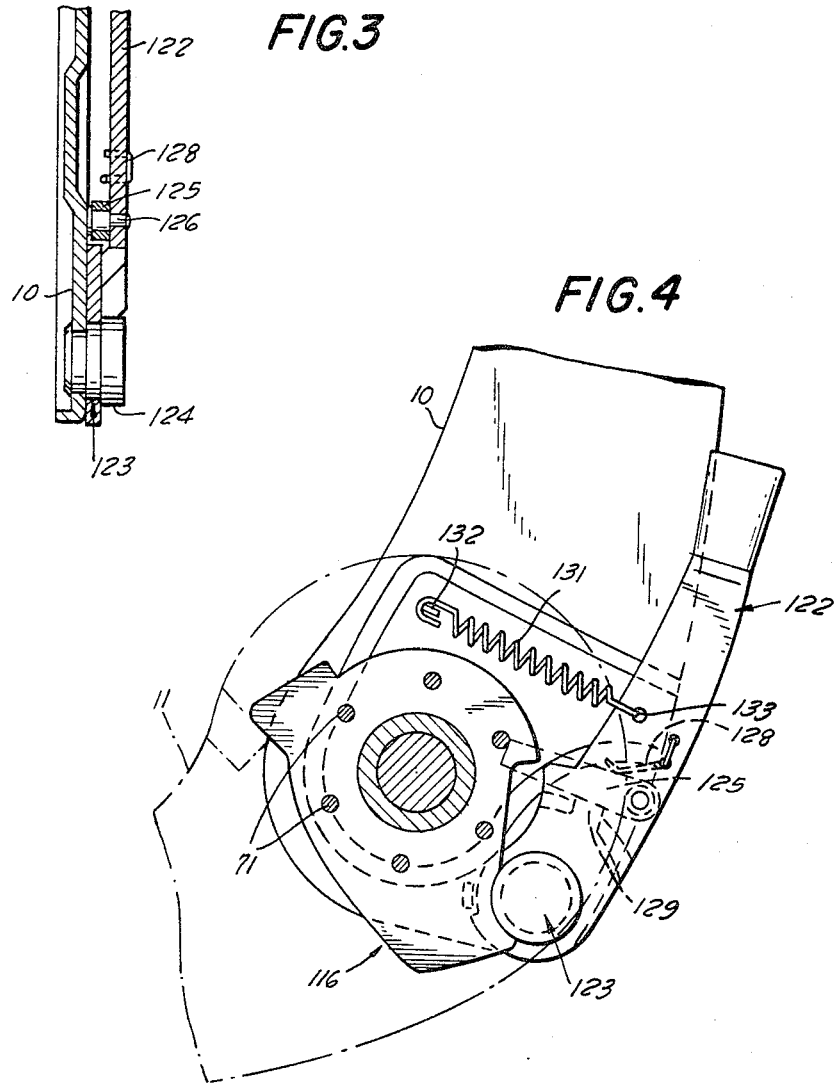

ABSTRACT OF THE DISCLOSURE

A two part hinge fitting especially for motor vehicle seats in which a fixed hinge member fixedly connected to the seat and a tiltable hinge member fixedly connected to the seat back are articulatedly connected to each other and which includes means for gradually adjusting the position of the hinge members relative to each other, and releasable locking means, which when released, will permit a quick tilting of the tiltable hinge member and the seat back connected thereto relative to the fixed hinge member connected to the actual seat portion.

Background of the invention

The present invention relates to a two part hinge fitting for seats with an adjustable back rest, especially for motor vehicles in which a fixed hinge member fixedly connected to the seat and a tiltable hinge member fixedly connected to the back rest are articulately connected to each other and in which an adjusting and arresting means is provided for gradually adjusting the position of the two link members relative to each other, which means include a ring gear having inwardly directed teeth and coordinated with one of the link members and a spur gear meshing with the ring gear and coordinated with the other link member, in which the outer diameter of the spur gear is smaller than the root diameter of the ring gear for a distance at least equal to the height of one tooth, and in which one of the two link members is mounted on an eccentric which in turn is pivotally arranged on the pivot pin which articulately connects the hinge member to each other, and which eccentric may be turned by a handle connected thereto. The eccentricity of the eccentric is substantially equal to the difference between the root diameter of the ring gear and the outer diameter of the spur gear and this difference is chosen in such a manner to assure self-locking between the gears. This known hinge fitting has the great advantage that it requires very little space, which is of especial importance if the hinge fitting is used on a seat of a motor vehicle. With this hinge fitting it is possible to adjust the back rest relative to the seat in any desired manner. On the other hand, this known hinge fitting has the disadvantage that it is not possible to freely tilt the back rest with respect to the seat if a quick adjustment of the position of back rest and seat should be desired. The two gears of the adjusting arrangement will always be in meshing contact with each other and an adjustment is only possible by means of the handle connected to the eccentric.

It is an object of the present invention to overcome this disadvantage of the above-described two part hinge fitting.

It is a further object of the present invention to provide for a two part hinge fitting in which the relative position of the two parts can be gradually adjusted by turning the handle and in which, if desired, the tiltable hinge member may be tilted freely with respect to the fixed hinge member to thus provide for a quick adjustment of the back rest relative to the seat.

Summary of the invention

With these objects in view, the two part hinge fitting according to the present invention for adjustably connecting a seat and a back rest, especially for motor vehicles, mainly comprise a fixed hinge member adapted to be fixedly connected to the seat, a tiltable hinge member adaptd to be fixedly connected to the back rest, pivot means for pivotally connecting the hinge members to each other, a spur gear coordinated with one of the hinge members, a ring gear having inwardly directed teeth meshing with only part of the teeth of the spur gear and being coordinated with the other of the hinge members, in which the outer diameter of the spur gear is smaller than the root diameter of the ring gear for a distance at least equal to the height of one tooth, eccentric means turnably carried by the pivot means and having an eccentric portion of an eccentricity substantially equal to the difference between the aforementioned outer diameter and the root diameter, in which the difference is chosen such so as to assure self-locking between the gears, turning means connected to the eccentric for turning the same about the pivot axis, and releasable locking means connecting the gear which is coordinated with the tiltable hinge member to the latter so that the tiltable hinge member may be tilted relative to the fixed hinge member after release of the locking means without operating the turning means, the releasable locking means comprising a first locking member fixed to the gear coordinated with the tiltable hinge member and a movable locking member mounted on the tiltable hinge member movable between a locking position engaging the first locking member and a releasing position disengaged therefrom.

In this arrangement according to the present invention the relative position of the back rest to the seat can be gradually and finely adjusted by turning the turning means, and a quick adjustment is also possible by releasing the locking means so that the back rest may be gripped by hand and freely turned to any desired position.

The locking means may comprise a first locking member in the form of a locking disc formed with a locking nose, and a second locking member in form of a locking lever tiltably mounted on the tiltable hinge member and having a projection engaging the locking nose in the locking position of the locking means. The locking means preferably includes also biasing means constructed and arranged and cooperating with the aforementioned locking lever to yieldably hold the locking means in the locking position thereof.

According to a further feature of the present invention, the arrangement may also include arresting means cooperating with the locking lever and being movable between an arresting position holding the locking lever in the releasing position and an inactive position. The arresting means may comprise a lever tiltably mounted on the locking lever and an abutment on the locking disc engaged by the arresting lever in the arresting position thereof. The arrangement may include further biasing means cooperating with the arresting lever for moving the latter to the arresting position thereof. It is also advantageous to provide second abutment means on the locking lever and cooperating with the arresting lever for preventing movement of the latter under the influence of the biasing means beyond the arresting position.

The novel features which are considered as characteristic for the invention are set forth in particular in the appended claims. The invention itself, however, both as to its construction and its method of operation, together with additional objects and advantages thereof, will be

Brief description of the drawing

FIG. 3 is a partial cross section taken substantially along the line III—III of FIG. 1; and FIG. 4 is a cross section similar to FIG. 1 in which the locking means are shown in the disengaged position.

Description of the preferred embodiment

Figure 1:
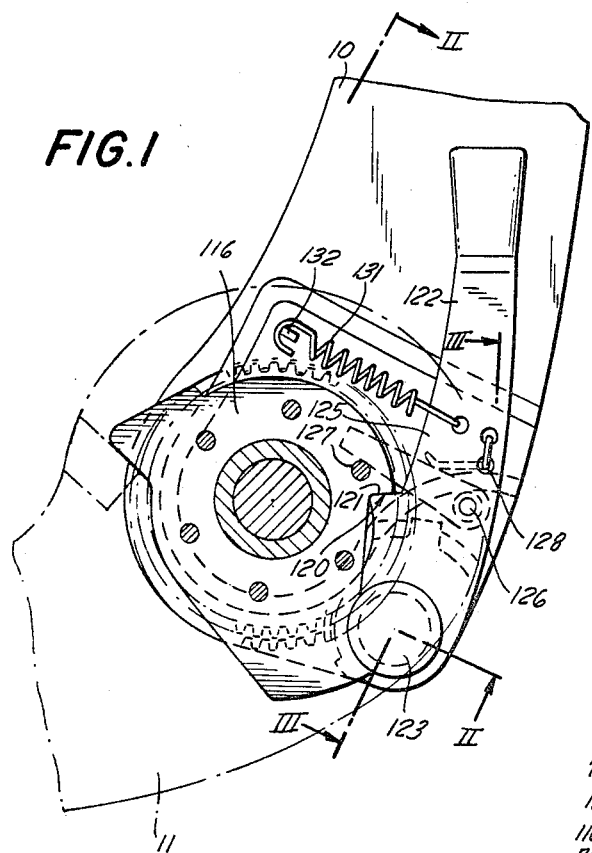
FIG. 1 is a section taken along the line I—I of FIG. 2 of the two part hinge fitting according to the present invention in which the locking means are shown in the locking position.
Figure 2:
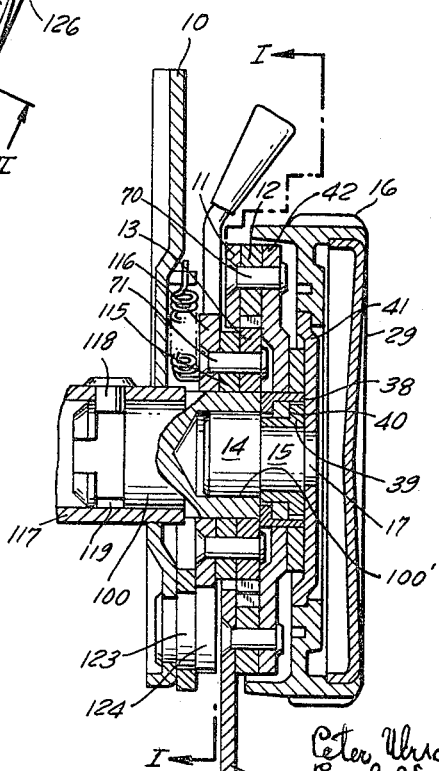
FIG. 2 is a cross section taken substantially along the line II—II of FIG. 1.

Referring now to the drawings, and more specifically to FIGS. 1 and 2 of the same, it will be seen that the two part hinge fitting according to the present invention comprises a tiltable hinge member 10 adapted to be fixedly connected to a back rest, not shown in the drawing, and a fixed hinge member 11 adapted to be fixedly connected to a seat, likewise not shown in the drawing. It is mentioned that in the various figures of the drawing only those parts of the two part hinge fittings are shown which are necessary for the proper understanding of the present invention. All means for attaching the hinge members 10 and 11 to the back rest and the seat are omitted from the drawing.

The hinge fitting comprises further a ring gear 12 having radially inwardly directed teeth and a spur gear 13, which together with the ring gear forms the essential components of the adjusting and arresting mechanism of the link fitting. The gears 12 and 13 are constructed and arranged with respect to each other that only a part of the teeth of the gear ring 12 are in meshing engagement with those of the spur gear 13. Which part of the teeth are in engagement with each other will depend on the relative position of the back rest connected to the tiltable hinge member 10 with respect to the seat fixedly connected to the fixed hinge member 11. The number of teeth of the ring gear 12 differ by at least one from the number of teeth on the spur gear 13. Furthermore, the outer diameter of the spur gear is smaller than the root diameter of the ring gear 12 at least for a distance equal to the height of one tooth.

The spur gear 13 is fixedly connected by a plurality of rivets 71 to a locking disc 116, whereby an additional disc 115 is sandwiched between the spur gear 13 and the locking disc 116 with the rivets 71 passing also through the additional disc 115, as clearly shown in FIG. 2. The unit comprising the spur gear 13, the disc 115 and the locking disc 116 is fixedly connected in any suitable manner to a bolt 100 coaxially arranged therewith, by being for instance welded or keyed thereto. The left end, as viewed in FIG. 2, of the bolt 100 is inserted into the interior of a tube 117 which forms a connection to the opposite side of the seat. The bolt 100 is provided in the region of a free end thereof with a circumferential groove 119 in which a pin 118 passing through a bore formed in the tube 117 is engaged. A bore 100′ is coaxially formed in the other or right end, as viewed in FIG. 2, of the bolt 100 in which an eccentric 14 is fitted, which eccentric 14 has an eccentric portion 15 projecting beyond the right face, as viewed in FIG. 1, of the bolt 100 and which has at its outer free end an integral reduced diameter portion 17. The reduced outer diameter portion 17 of the eccentric 14 carries fixedly connected thereto a handle portion 16 which, at its front face is covered by a cover plate 29 inserted or press-fitted into a corresponding cavity of the handle portion 16.

The hinge fitting according to the present invention includes further a gear ring 12 having radially inwardly directed teeth arranged and constructed to be in meshing engagement only with some of the teeth of the spur gear 12 and a disc 42 coaxially arranged with the ring gear 12 and connected to the latter and to the fixed hinge member 11 by a plurality of rivets 70. The disc 42 is mounted by means of an elastic bearing on the eccentric portion 15 of the eccentric 14. The elastic bearing serves mainly to compensate for manufacturing tolerances during assembly of the components. The elastic bearing comprises two bearing halves 38 and 39 which enclose an annular elastic member 40.

While a gradual adjustment of the position of the back rest relative to the seat can be carried out by turning the handle 16, the hinge fitting according to the present invention is constructed also to permit a quick adjustment of the back rest relative to the seat without operating the handle 16.

For this purpose the hinge fitting includes also releasable locking means connecting that gear which is coordinated with a tiltable hinge member to the latter so that the tiltable hinge member may be quickly tilted relative to the fixed hinge member after release of the locking means without operating the turning means or the handle 16. The releasable locking means includes a locking lever 122 turnable about a pivot pin 123 which is fixed to and projects from the tiltable hinge member 10. The pivot pin 123 has a large diameter portion 123 projecting toward the right, as viewed in FIG. 2, beyond the lever 122 and an extension of the locking disc 116 which forms part of the locking means abuts against the portion 123 of the pivot pin 123, as clearly shown in FIG. 1. The locking lever 122 has intermediate its ends a projection 122 which engages in the locking position of the locking means a locking nose 121 formed in the locking disc 116. When the projection 120 is in engagement with the locking nose 121, the position of the tiltable hinge member 10 and the seat back connected thereto relative to the fixed hinge member 11 and the seat connected to the latter may be adjusted only by turning the handle 16.

The arrangement preferably includes also biasing means which may be in the form of a coiled tension spring 131 connected at one end to the locking lever 122 and at the other end to a flap 132 stamped and bent out from the tiltable hinge member 10 so that the tension spring 131 tends to keep the locking means in the locking position as shown in FIG. 1 in which the projection 120 engages the nose 122.

When the locking lever 122 is turned against the tension of the spring 121 about the pivot pin 123 in clockwise direction to the position shown in FIG. 4, the locking means are released. The arrangement preferably includes also arresting means which may comprise an arresting lever 125 pivotally mounted by means of a pivot pin 126 on the locking lever 122 as best shown in FIG. 2. The free end of the arresting lever 125 abuts in the arresting position of the lever as shown in FIG. 4 on an abutment 127 fixed to the locking disc 116 which may be integrally formed with one of the rivets 71. In the arresting position as shown in FIG. 4, the arresting lever 125 engages with its bottom face the top face of an additional abutment 129 integrally formed with the locking lever 122. A small wire spring 128 connected to the locking lever 122, as best shown in FIGS. 1 and 3, tends to maintain the arresting lever in the position as shown in FIG. 4, whereby the abutment 129 prevents turning of the arresting lever 125 under the influence of the spring 128 beyond the arresting position.

The above-described hinge fitting will operate as follows:

When the components of the hinge fitting are in the relative position to each other as shown in FIG. 1, in which the locking means are engaged, the position of the tiltable hinge member and the not illustrated back rest fixedly connected thereto may be adjusted with regard to the fixed hinge member and the non-illustrated seat connected to the latter only by turning the handle 16.

If the locking lever 122 is tilted about its pivot pin 123 against the pressure of the tension spring 121 to the releasing position as shown in FIG. 4, the hinge member 10 may be freely tilted with respect to the fixed hinge member 11 so that a quick adjustment of the position of the back rest relative to the seat is possible. In the illustrated arrangement only a free forward tilting at the back rest is contemplated from the normal seating position to a position in which the tiltable hinge member 10 and the back rest connected thereto is swung forwardly in counterclockwise direction relative to the fixed hinge member 11 to facilitate entrance of a passenger to the rear seat of a motor vehicle, and such free tilting is accomplished by gripping the back rest connected to the hinge member 10 by hand and tilting it in counterclockwise direction. During such movement, the free end of the projection 120 will ride on the curved guide surface 130 provided on the outer periphery of the locking disc 116 and following the nose 121 formed in the locking disc. When the back rest is subsequently turned in the opposite direction to the normal seating position, then the projection 120 will pass the locking nose 121 and the locking lever 122 will be automatically moved by the tensioned spring 131 to the locking position shown in FIG. 1. If the back rest is then not in the position desired by the user, the position of the back rest may be adjusted by turning the handle 16.

It will be understood that each of the elements described above, or two or more together, may also find a useful application in other types of two part hinge fittings, especially for motor vehicle seats differing from the types described above.

While the invention has been illustrated and described as embodied in a two part hinge fitting permitting gradual fine adjustment of the back rest relative to the seat and free tilting of the back rest for quickly adjusting the position thereof relative to the seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A two part hinge fitting for adjustably connecting a seat and a back rest, especially for motor vehicles, comprising, in combination, a fixed hinge member adapted to be fixedly connected to the seat; a tiltable hinge member adapted to be fixedly connected to the back rest; pivot means pivotally connecting said hinge members; a spur gear coordinated with one of said hinge members; a ring gear having inwardly directed teeth meshing with only part of the teeth of the spur gear and being coordinated with the other of said hinge members, the outer diameter of said spur gear being smaller than the root diameter of said ring gear for a distance at least equal to the height of one tooth; eccentric means turnably carried by said pivot means and having an eccentric portion of an eccentricity substantially equal to the difference between said outer diameter and said root diameter and said difference being such so as to assure self-locking of said gears; turning means connected to said eccentric for turning the same about said pivot means; and releasable locking means connecting that gear which is coordinated with said tiltable hinge member to the latter so that said tiltable hinge member may be tilted relative to said fixed hinge member after release of said locking means without operating said turning means, said releasable locking means comprising a first locking member fixed to said gear coordinated with said tiltable hinge member and a movable locking member mounted on said tiltable hinge member movable between a locking position engaging said first locking member and a releasing position disengaged therefrom.

2. A two part hinge fitting as defined in claim 1, wherein said tiltable hinge member is tiltably carried by said pivot means, wherein said spur gear is fixedly connected to said pivot means, and wherein said ring gear is fixedly connected to said fixed link member.

3. A two part hinge fitting as defined in claim 2, wherein said first locking member comprises a locking disc formed with a locking nose and said second locking member comprises a locking lever tiltably mounted on said tiltable hinge member and having a projection engaging said locking nose in the locking position of said locking means, said locking disc having a peripheral surface portion on which said projection of said locking lever is adapted to slide when after release of said locking means said tiltable hinge member is turned in one direction relative to said fixed hinge member.

4. A two part hinge fitting as defined in claim 3, and including biasing means constructed and arranged and cooperating with said locking lever to yieldably hold said locking means in said locking position.

5. A two part hinge fitting as defined in claim 4, wherein said biasing means comprises a spring.

6. A two part hinge fitting as defined in claim 4, and including a pivot pin fixed to and projecting from said tiltable link member and pivotally carrying said locking lever, said pivot pin having a portion projecting beyond said locking lever against which a portion of said locking disc abuts.

7. A two part hinge fitting as defined in claim 3, and including arresting means cooperating with said locking lever and being movable between an arresting position holding said locking lever in said releasing position and an inactive position.

8. A two part hinge fitting as defined in claim 7, wherein said arresting means comprises a lever tiltably mounted on said locking lever and an abutment on said locking disc engaged by said arresting lever in said arresting position thereof.

9. A two part hinge fitting as defined in claim 8, and including biasing means cooperating with said arresting lever for moving the latter to said arresting position.

10. A two part hinge fitting as defined in claim 9, and including second abutment means on said locking lever and cooperating with said arresting lever for preventing movement of the latter under the influence of said biasing means beyond said arresting position.

References Cited

UNITED STATES PATENTS

| 1,564,435 | 12/1925 | May | 74—530 |
| 2,784,770 | 3/1957 | Herr | 297—367 |
| 3,299,466 | 1/1967 | Werner | 297—366 |

BOBBY R. GAY, *Primary Examiner.*

DORIS L. TROUTMAN, *Assistant Examiner.*

U.S. Cl. X.R.

297—366